United States Patent [19]

Harris

[11] Patent Number: 4,613,471

[45] Date of Patent: Sep. 23, 1986

[54] EXTRUDED PLASTIC FOAM DENSITY CONTROL SYSTEM AND METHOD

[75] Inventor: Holton E. Harris, Westport, Conn.

[73] Assignee: Harrel, Incorporated, East Norwalk, Conn.

[21] Appl. No.: 630,956

[22] Filed: Jul. 16, 1984

[51] Int. Cl.$^4$ .................... B29C 47/92; B29C 67/22; B29C 47/02

[52] U.S. Cl. ................. 264/40.1; 264/40.4; 264/40.7; 264/45.9; 264/53; 264/54; 264/174; 425/113; 425/140; 425/145; 425/148; 425/817 C

[58] Field of Search .................... 264/40.4, 40.7, 40.1, 264/45.9, 53, 54, 174; 425/140, 145, 148, 817 C, 113

[56] References Cited

U.S. PATENT DOCUMENTS

| | | | |
|---|---|---|---|
| 3,914,357 | 10/1975 | Cereijo et al. | 264/40.4 X |
| 4,237,082 | 12/1980 | LaSpisa et al. | 264/40.7 X |
| 4,244,897 | 1/1981 | Moon | 264/40.4 X |
| 4,249,876 | 2/1981 | Strausfeld et al. | 264/40.4 X |
| 4,514,812 | 4/1985 | Miller et al. | 264/40.7 X |

*Primary Examiner*—Philip Anderson
*Attorney, Agent, or Firm*—Brumbaugh, Graves, Donohue & Raymond

[57] ABSTRACT

A system and method for the control of the density of extruded foam controls foaming based on the volume per unit time of extrudate being formed. A gear pump controls the flow of melt to the die. The pump speed provides an accurate measure of the volume per unit time of melt moving to the die. The speed and cross-sectional dimensions of the extrudate are measured to determine the volume per unit time of the extrudate. Since the unfoamed melt density times the volume per unit time of the unfoamed melt being delivered to the die is equal to the density of the foamed extrudate times its volume per unit time, a ratio of the density of foamed extrudate to unfoamed melt can be determined from the two volume per unit time calculations. Once the ratio for an appropriate foam density is determined empirically, density-affecting characteristics of the extruder can be controlled to bring the calculated ratio towards the desired ratio. If the actual density of the unfoamed melt is known, the actual density of the foamed extrudate can be determined. In that case, the extruder is controlled to bring the calculated density towards a desired density. With the gear pump run at constant speed, measurements determinative of volume per unit time of the extrudate are sufficient to control density. Alternatively, if the volume per unit time of extrudate being produced is held constant then foam density can be controlled by controlling the rate of delivery of unfoamed melt to the die.

48 Claims, 5 Drawing Figures

EXTRUDED PLASTIC FOAM DENSITY CONTROL SYSTEM AND METHOD

BACKGROUND OF THE INVENTION

This invention relates to a system and method for the control of the density of extruded foam and more particularly to a system and method wherein control of an extrusion line is based, at least in part, on foam density as determined by comparing the volume of per unit time of extruded foam with the volume per unit time of unfoamed melt being delivered to an extruder die.

Currently, one of the fastest growing branches of the extrusion industry is the extrusion of plastic foam. There are many shapes of extruded product where a given bulk is desired, but strength requirements are modest, so that the foamed product has sufficient strength for the purpose. That is to say the strength of extruded solid plastic is not required. Typical examples are individual hamburger containers used at hamburger retail outlets. These familiar containers are, today, often formed in a "clam shell" design made from foam plastic sheet. The foam gives good thermal insulation and has as much strength as containers made for the same purpose from paper product. Foamed plastic, used in this way, provides a particularly good opportunity for cost savings. In order to save material when extruding solid plastic, only the dimensions can be changed. In other words, the amount of plastic used in the production of a particular product is dependent upon the cross-sectional dimensions of the extrusion. By keeping the oversize tolerance of such products to a minimum the amount of plastic consumed can be controlled, but even under the tightest extrusion control little savings are accomplished, because oversized cross-sectional dimensions are likely to be, in practice, only minimally above the upper dimensional limits.

With foamed plastic, material can still be saved by maintaining tight cross-sectional tolerances, but there is a much larger possibility, and that is controlling the density of the foam. If a given product is actually made with foam whose density is 70% of what it would be if it were made with a solid plastic, and that foam is compared with a foam that is only 35% as dense as the solid plastic, there is a 2:1 ratio in the amount of plastic which will be used in the two cases. And so it will be seen, that for foam plastic products extremely large variations in the amount of the plastic being consumed is possible even when the extrusion conforms to tightly held dimensional tolerances.

In the past, it has been suggested that a nuclear gauge, which measures mass per unit area, plus an independent dimension-measuring system which measures thickness directly, be used to determine plastic foam density. For foamed plastic sheet, for example, if the width and the speed of the extrusion remain constant and the actual thickness is known, then the volume per unit time of the foam being extruded is available. If the mass per unit time is determined, for example by a nuclear gauge, density can be calculated. Once density can be determined on a continuous basis, then a closed loop control system can be employed to control those extruder operating characteristics that affect density.

The inventor has successfully tried this approach, but has found, while the closed loop control operates as expected, the weakness of this system lies in the nuclear gauge, which is not very precise in its measurement of mass per unit area. Thus, a system and method for controlling plastic foam density that accurately determines density or a density-related control value, for the purpose of precise extrusion line control to minimize density and thus minimize the rate at which raw plastic is consumed, would amount to a considerable advance. The current invention accomplishes just that.

BRIEF SUMMARY OF THE INVENTION

In accordance with this invention, a system and method is provided that determines a value used to control the density-affecting characteristics of an extrusion line. A foam density related figure derived at least in part, from the volume of foam being extruded, is used to develop the value that controls the density affecting extruder characteristics. The density related figure can be determined by comparing the volume of unfoamed material being delivered to the extruder die at the extrusion end of an extruder with the volume of foamed extrudate being produced. Dimensional measurements determine the volume per unit time of extruded foam. The system and method can be employed to measure the ratio of the foamed extrudate density to the density of the unfoamed material, to develop the actual value of the density of the foamed extrudate, or to generate another density-related value. If the volume per unit time of unfoamed melt being delivered to the die is held constant and the cross-sectional dimensions of the foamed extrudate are constrained against variation, then the speed of the extrudate can be the measurement that is determinative of volume and density.

Where it is the ratio of densities or another density-related value that is continuously calculated, this value is compared to a preselected, desired value that may be set and stored in memory for this purpose. The desired value can be developed empirically based on experimental runs of the foam. Once determined, of course, that value can be used each time a particular foam or foam product is to be extruded using a particular raw material.

When the actual density is the basis for controlling the density-affecting operating characteristics of the extrusion line, the density of the unfoamed material is used along with the volume of the unfoamed melt being delivered to the die to calculate the density of the foamed extrudate based upon its measured volume per unit time.

Alternatively, if the volume per unit time of the foamed extrudate being produced is held constant, for example by a sizing tube and a constant pull roll speed then extrudate density no longer depends on the volume per unit time. In this case control of the volume of unfoamed melt delivered to the die and of the foaming agent will control density.

While the systems and methods of this invention apply to extrusion of both rubber and plastic foam, these shall be described hereinafter with reference to plastic.

To describe how the foam density or a ratio of foamed to unfoamed density can be developed for use in controlling the extruder, it is useful to consider the mechanism of plastic foam extrusion. Plastic foam extrusion is similar to the extrusion of solid plastic, except that before the product leaves the extruder a foaming agent is introduced. There are two ways this can be done. One way is to mix a chemical foaming agent in with the plastic feed stock, the plastic being introduced into the extruder. This foaming agent is activated by heat in the extruder. Nothing happens as long as the plastic is in the extruder and die because the pressures on the plastic are so great that foaming cannot take place. As soon as the plastic exits from the die, however, the pressure is released, and the foaming takes place, greatly expanding the volume of the plastic. A second way of creating foam is to inject a liquified gas, such as Freon, into the plastic while it is still in the extruder. The gas is injected under very high pressure, sufficient so that it stays in liquid form. It remains as a liquid until the plastic leaves the extruder, at which time the pressure is released, the foaming agent turns into a gas, and the plastic expands into a foam.

Although the actual mechanism for doing all of this can be fairly complex, these practices are well known in the industry, and because they do not form a part of the invention, they need not be addressed in great detail here.

In the case of gas injection, the actual extruder arrangement is typically two extruders operating in series. The first, or primary extruder processes the plastic in the manner of a normal extruder. The liquified gas is injected near the end of this first extruder. The plastic then goes from this first extruder through a heated connecting pipe and into the second extruder. The second extruder acts somewhat like a giant heat exchanger; its main function is to extract heat from the melt. It is, therefore, called the cooling extruder. The fact that there are two extruders instead of one does not affect the principle of operation. A liquified gas or other blowing agent is injected near the end of the first extruder, and the pressure is kept high enough through that extruder, the connecting pipe, and the cooling extruder and die, so that the gas remains liquid until the plastic exits from the die. At that point, it becomes a gas and causes the solid plastic to blow up into a foam.

When a chemical foaming agent is used, the set-up is usually more conventional. A single extruder is typically used, with a more or less conventional arrangement. The foaming, again, does not take place until after the plastic has exited the extruder.

In accordance with the invention, a precision gear pump is used with the extruders in either of the two cases above. The principles and advantages of the gear pump have been set out in the inventor's prior U.S. Pat. No. 4,209,476, incorporated herein by reference and assigned to the Assignee of the present invention, and in the inventor's prior U.S. patent application Ser. No. 534,641, filed Dec. 19, 1983, assigned to the Assignee of the present invention. Primary among the advantages of the gear pump for the purposes of this invention is the fact that it is a precise metering device. Every time the pump goes around, a very precisely metered quantity of plastic is delivered to the output, which is to say the die. This precise quantity is a precise volume of the plastic before it has been foamed. The volume per unit time of unfoamed plastic is thus controlled by the pump. With the pressure in the extruder high enough to prevent foaming in the extruder, weight per unit time of the melt and of the extrudate is controlled. The density of the foamed plastic is thus a function of its volume and if the dimensional limits of the extrudate are maintained then volume and hence density is a function of the pull-off speed.

In the system and method of the invention an independent means of measuring the volume after expansion is employed.

1. In the case of foamed sheet, as for example the sheet for the hamburger containers mentioned above, it is customary to extrude in the form of a hollow tube. This tube is forced over a round torpedo after it leaves the extruder. Two knives on each side of this torpedo slit the sheet into two sections which are then flattened and rolled onto rolls.

a. It is apparent that the total width of the top and bottom sections of the extrudate is always equal to the circumference of the torpedo, which sets the foam tube's inner diameter and hence the total width of the two slit pieces.

b. It is simple to measure the length per unit time of the extrudate by means of a counter on the pull rolls, the rolls that pull the sheets away from the die, or by means of an idler running over the sheet.

c. The thickness of the sheet can be measured by a mechanical shoe riding over the surface of the sheet or it can be measured by a thickness gauge of the type manufactured by Indev Corporation, Bristol, R. I.

d. Once thickness, length per unit time, and width of the sheet are known, volume per unit time of the sheet can be calculated. This, then, is the volume after foaming, the volume in the finished state.

2. The volume after foaming of blown film foam is determined similarly. Blown film foam is a tube of thin foamed film ordinarily formed by the introduction of air into its interior to form a bubble.

a. The diameter of the bubble can be determined in known manner. This procedure is currently commonplace in the industry.

b. The length per unit time can be measured by measuring the speed of nip rolls where the bubble walls are brought together to form a flattened tube of the thin plastic foam film or again by measuring the speed of an idler wheel contacting the surface of the bubble.

c. The thickness of the foam film can be determined as above after the bubble has been collapsed at the nip rolls, and then slit.

3. The volume of foamed insulation on wire can likewise be determined.

a. The inside diameter of the insulating foamed tube is equal to the outside diameter of the wire. This may be measured by a laser gauge before the wire enters the extruder.

b. The outside diameter of the tube may be measured by a laser gauge after foaming.

c. The length per unit time may again be measured by a counter on a pull roll or by an idler contacting the wire.

d. Knowing the outside diameter, the inside diameter, and the length per unit time, the volume per unit time is readily calculated.

The above are merely examples indicating that it is, in general, always possible to measure the volume of the extrudate after it has been foamed. The complexity of the extrudate cross-section will determine how many measurements must be made for volume per unit time to be calculated. For example, an extrudate of foamed plastic rod requires a measurement only of diameter and speed to determine volume per unit time. Sheets or other rectangularly shaped extrudate require knowing or measuring width and thickness. For more complex shapes additional measurements are required. Furthermore, if the cross-section of the extrudate is maintained constant, then the speed of the extrudate will be the only dimensional characteristic (i.e., length per unit time) that will need to be measured. For example, if a sizing tube is used to determine the outside diameter of a foam rod, the measured speed and the known diameter of the extrudate, corresponding to the sizing tube inside diameter, will provide sufficient data to determine volume per unit time of the extrudate.

The product of the volume per unit time of the unfoamed plastic being delivered to the die and its density is equal to the product of the volume per unit time of the foamed plastic being produced and its density. Thus, knowing (1) the volume of the unfoamed plastic from the gear pump capacity and speed and (2) the volume of the extrudate after foaming, one can determine the ratio of the density of the extrudate to the density of the unfoamed plastic by dividing the volume per unit time of unfoamed plastic by the volume per unit time of the foamed extrudate. If this ratio is compared to a ratio determined empirically from a foam of appropriate properties and density, such density-affecting operating characteristics of the extruder as the amount of foaming agent introduced per unit volume of plastic can be controlled to hold the measured ratio at or near the desired ratio for an efficient use of plastic in producing foam of desired properties.

If the density of the unfoamed plastic is known, the actual density of the foamed plastic extrudate can be used to control extrusion line operation. By dividing the measured volume per unit time of extrudate into the product of the unfoamed plastic density and the volume per unit time thereof being delivered to the die, the density of the foam extrudate can be calculated. Comparing this to a desired, preselected extrudate density will permit control of the density-affecting extruder operating characteristics to keep the density at or near that desired.

In foam extrusion lines using just one extruder, the gear pump is located downstream of the extruder barrel and just upstream of the die. In foam extrusion lines employing a primary extruder followed by a cooling extruder, the gear pump could be similarly located following the barrel of the second extruder, just upstream of the die, but it is preferred to locate the gear pump following the primary extruder and preceding the cooling extruder so that heat introduced to the melt by the gear pump can be extracted in the cooling extruder. This latter arrangement does not affect the principles described above, since foaming does not take place until the extrudate exits the die after the second, cooling extruder.

In addition to controlling the amount of foaming agent being introduced, any controllable operating characteristic that affects density can be varied based on the departure of the foam density or density ratio from the desired value. For example, for a chemical foaming agent, rather than varying the total amount of the foaming agent being introduced, the amount of one or more components of the foaming agent may be varied, where the foaming agent is made up of two or more components that chemically react to cause foaming and where variation in the relative amounts of the constituent components affect the degree of foaming. Variation of the temperature of the plastic before or after extrusion can affect the amount of foaming. The temperature can alter the degree of foaming in several ways. Temperature can vary the reaction of a chemical foaming agent to affect the degree of foaming. Temperature affects the viscosity of the plastic such that upon exiting the die the plastic permits more or less expansion of the foam. Temperature of the gas producing the foaming in the extrudate affects the pressure of the gas within the foam to cause more or less expansion. Since the pressure in the extruder affects the temperature of the plastic melt, pressure control affords another opportunity for controlling the amount of foaming in the extrudate, and hence controlling density. Because a gear pump is used in accomplishing the current invention, pressure can be varied without changing the volume of melt passed to the extrudate die. Alteration of the extruder screw speed without changing gear pump speed will provide the means for pressure alteration. Changing the temperature of melt in the extruder can be accomplished by altering the barrel temperature, the gear pump temperature, the temperature of the adapter between the gear pump and die, or the temperature in the die zone. Likewise, where the environment into which the extrudate emerges is susceptible of control, the temperature or pressure here can be altered to vary the amount of foaming. In the case of gas injection, in addition to controlling the rate of introduction of the liquified gas foaming agent, the composition of the gas foaming agent can be controlled for the purpose of controlling the degree of foaming and thus the density of the foam. The pressure of the gas introduced, and again as above, the temperature affect the degree of foaming with gas.

To accommodate changes in volume per unit time of the extrudate, the pull roll speed can also be adjusted as necessary based on density of the extrudate. Decreasing the density, for example, increases length of the extruded product in a given time if the cross-sectional dimensions are maintained. Hence an increase of the pull off speed is necessary. Pull roll speed may itself be employed as a density affecting extrusion line characteristic. Where the foamed extrudate is dimensionally constrained, such as by a sizing tube, it can be seen that if the extrudate is moved very slowly through the tube, the tube will significantly reduce foaming by preventing expansion. But if the pull roll speed is increased, other characteristics being equal, greater expansion can be achieved by virtue of the volumetric increase being accommodated by the greater linear dimension moving out of the tube in a given time.

Controlled another way, the amount of foaming can be constant, for example by maintaining the foaming agent gas injection constant, while density is controlled by varying the speeds in the extrusion line such that a greater weight of melt is delivered to the die, foamed and pulled off by the pull rolls. In this respect, varying the foaming agent introduction should be understood to mean varying the amounts of the foaming agent relative to the amount of raw material being introduced and delivered as melt to the die.

In short, any extruder operating characteristic that has an effect on the amount of foaming expansion of the extrudate and that is controllable can be employed to control density.

Comparison of the calculated density ratio or foamed plastic density with a preset, desired value can provide an error value usable with any desired control algorithm for control of the one or more of the density-affecting extrusion line operating characteristics. Such algorithms, for the feedback control of processes in general and extruder operation in particular, are known in the art. These include proportional control and control algorithms combining a proportional term with one or both of integral and differential terms to take into account, not only the magnitude of the departure of the measured value from the selected or setpoint value, but also long term error or "droop" and the rate of change of the measured characteristic.

If the volumetric rate of delivery of unfoamed melt to the die is held constant by, for example, a gear pump running at fixed speed, then the volume of extrudate per unit time will vary inversely with extrudate density. By measuring the volume per unit time being extruded one can control the extrudate density either by calculating the density of the extrudate using known melt density and volumetric rate of flow to the die, or by comparing the measured extrudate volume per unit time to a previously, empirically determined volume per unit time figure for foam of suitable density. If the cross-sectional dimensions of the foamed extrudate are constrained against variation, as when a sizing tube is used, then volume per unit time changes in the extrudate can only result in extrudate speed changes, and speed measurement can be the single measurement needed for density control.

The density-related control system and method described can be employed with individual discrete controllers operating on analog representations of the stored and measured values, or with one or more digital controllers used for this and other control functions with respect to one or more extruders. The latter digital controllers are ordinarily microprocessor-based with memory for desired operating characteristics. These are thus particularly suited to store needed data, such as sheet width, unfoamed plastic density, and the preselected ratio or density value, and to effect the computations discussed above.

The above and further features of the invention will be better understood with respect to the following detailed description of preferred embodiments considered in combination with the several figures of the accompanying drawings.

DETAILED DESCRIPTION OF PREFERRED EMBODIMENTS

Figure 1:
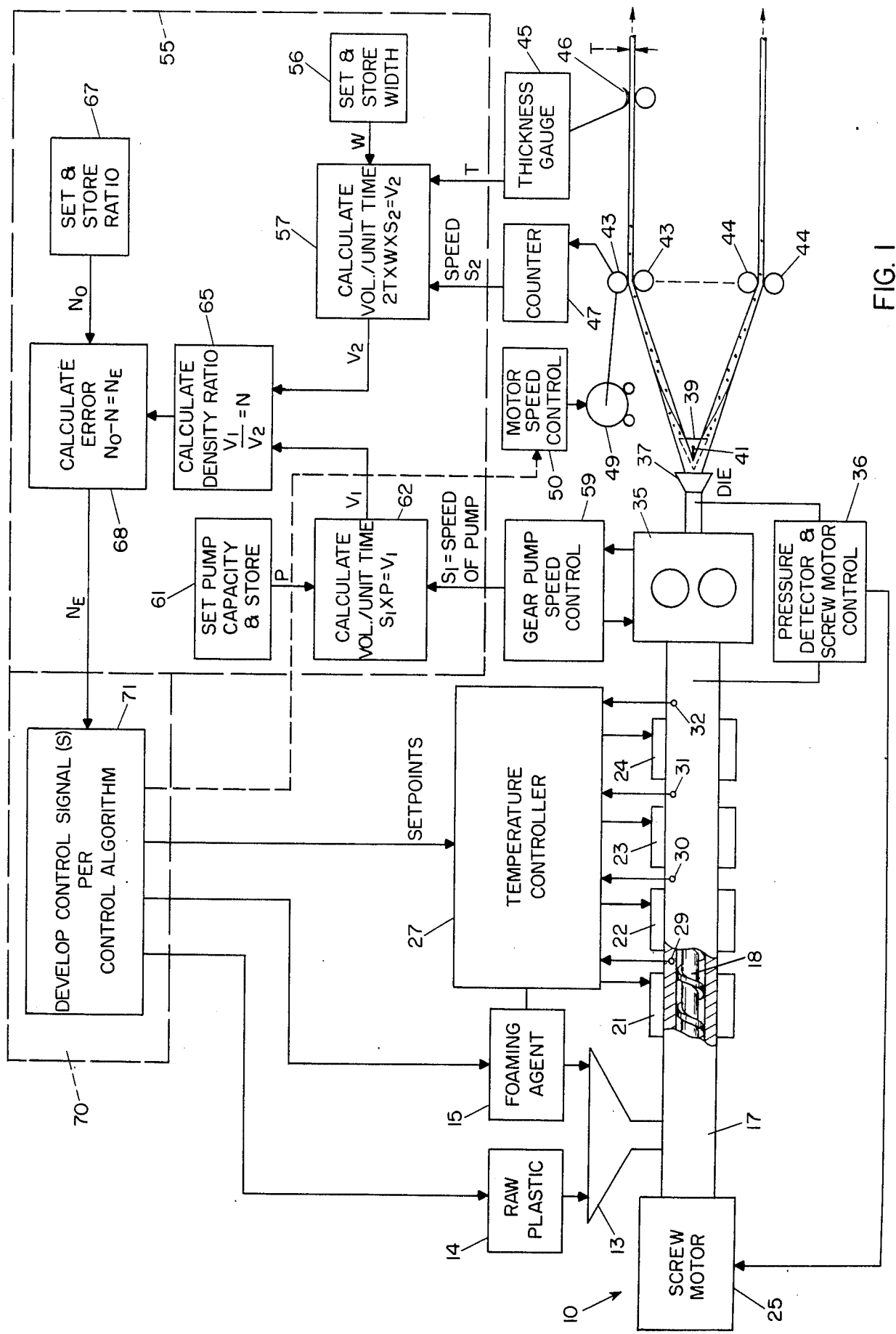
FIG. 1 is schematic illustration of a plastic extruder and system for control based on the ratio of foamed plastic density to unfoamed plastic density.

In FIG. 1, an extrusion line includes a plastic extruder 10 having a feeder 13 with variable means 14 for controlling the introduction of raw plastic and variable means 15 for controlling the introduction of a foaming agent into a barrel 17 of the extruder. In the barrel 17 a conventional screw 18 moves plastic towards the extrusion or die end of the extruder, mixing and melting the plastic as it moves. Within the barrel, the pressure on the plastic prohibits foaming by the foaming agent. The foaming agent is activated by the frictional heat introduced by relative movement of the plastic in the barrel as well as by such introduction of heat from conventional heat exchangers 21-24, as may be necessary to bring the plastic melt to the desired temperature. A screw motor 25 turns the screw 18 to deliver the unfoamed plastic melt towards the extrusion end of the extruder 10.

A temperature controller 27 controls the heat exchangers 21-24 in a manner well known in the art. Typically, the first of the exchangers 21 may introduce heat into the barrel for the purpose of melting the raw plastic, but as the plastic moves down the barrel one or all of the further exchangers may withdraw heat from the barrel as frictional heat raises the melt temperature. The heat exchangers 21-24, then, can be combination heater-coolers, arranged to circulate a cooling liquid or to energize Calrod type electrical heating elements, as dictated by the controller 27. The controller 27 is shown as a single unit, but may be individual discrete controllers, one for each heat exchanger. Ordinarily, the controller compares barrel temperature sensed by thermocouples or other heat sensors 29-32 to stored temperature setpoints representing desired values of temperature at the locations of the sensors 29-32. Systems for the control of temperature in plastic extruders are described in the inventor's prior U.S. Pat. No. 4,272,465, and in the inventor's prior U.S. Pat. No. 4,430,698, both of which are incorporated herein by reference and assigned to the assignee of this invention. Controllers suitable for this purpose are available from Harrel, Incorporated, the assignee of the current invention, as well as from numerous other manufacturers.

Downstream of the screw 18, the barrel 17 communicates with a gear pump 35. In the manner described in the inventor's U.S. Pat. No. 4,209,476, a pressured detector and screw motor control circuit 36 compares pressure on each side of the pump 35 to control the speed of the screw motor 25 and avoid either starving or overfeeding the pump.

The gear pump 35 delivers a precise volume of the unfoamed plastic every revolution, so that an indication of the speed of the pump is indicative of the volume of plastic moving downstream towards the extrusion end of the extruder terminating in a die 37. As the plastic exits the die, the pressure thereon is relieved and foaming occurs. In the example illustrated in FIG. 1, the extrusion line is arranged to produce sheets of foam plastic of a fixed width W. The foamed plastic flows over a torpedo 39 and is slit into upper and lower sheets by knives 41 on each side of the torpedo. Each sheet of the foamed plastic is drawn away from the die by a pair of pull rolls 43 and 44, arranged on a roll stand, and each sheet is then rolled onto rolls (not shown).

The width W of the two foam sheets is fixed by the outside diameter of the torpedo 39, where the sheets are slit apart, and is equal to half the circumference of the torpedo at that point. A thickness gauge 45 measures the thickness of a sheet. A tachometer, counter 47, or the like, measures the sheet speed from the speed of the pull rolls. Any of known thickness measuring devices can serve as the gauge 45. In the example of FIG. 1, the gauge is illustrated as the type that employs a shoe 46 riding on the sheet. The known width W, the thickness T, and the speed $S_2$ of the pull rolls provide information determinative of volume per unit time of the foamed extrudate. A motor 49 drives the pull rolls and known motor speed control circuitry 50 can be employed to determine that speed. The speed control circuitry 50 can vary the speed of the pull rolls 43 and 44 under the control of the extruder control circuitry, as described below.

The three volume determinative measures, width W, thickness T, and speed $S_2$, are supplied to computation means 55, which can be a microprocessor-based controller such as the Harrel CP-660 Digipanel Control System, the Harrel CP-671, or one of various other microprocessor-based control units available from various sources. Alternatively, of course, a minicomputer or the like can be employed as a computation means 55, in that the calculations to be described are well within the abilities of numerous small computers currently commercially available. In either case, the fixed width W is set and stored in memory as indicated at 56, and the volume per unit time $V_2$ is regularly calculated as indicated at 57, that volume in this example being $2TWS_2=V_2$. It will, of course, be understood that conversions of measured values $S_2$ and T, either from analog to digital in the case of analog counters and gauges, or from a particular digital code to one appropriate for use by the computation means 55 where the counter and gauge provide digital outputs, will be made in routine fashion.

An example of the use of a gear pump to determine the volume per unit time of flow of the unfoamed plastic is illustrated in FIG. 1. A gear pump speed control circuit 59 controls the speed of the gear pump motor (not shown) and provides an indication of the speed of the pump $S_1$. Again the computation abilities of controller or a minicomputer 55 is employed to use the pump capacity P, stored in memory as indicated at 61, to calculate the volume $V_1$ as indicated at 62. The rotational speed of the pump $S_1$ times its capacity P is, of course, the precisely metered volume of unfoamed plastic being delivered to the die. Again, it will be understood that the necessary conversions for computation use of the speed $S_1$ occurs routinely and, in the manner of the speed $S_2$, the gear pump speed $S_1$ may be measured independently by a tachometer or counter available for that purpose.

Recalling that the volume per unit time of unfoamed plastic $V_1$ times the density of that plastic must equal the volume per unit time of the foamed extrudate multiplied by its density, sufficient information is now available to the computation means 55 to develop a control value proportional to the density of the foam. In this case, as shown at 65, it is the ratio N of unfoamed plastic density to foamed density that is calculated.

From previous experience extruding foam sheet of acceptable density, a desired density ratio $N_0$ is entered into memory as indicated at 67. As shown at 68 that figure is compared to the measured density ratio N to develop an error signal $N_E$. The error signal $N_E$, equal to $N_0-N$, is provided to a feedback portion 70 of the control circuitry to develop control signals pursuant to a selected control algorithm as indicated at 71. The feedback arrangement 70 that develops the control signals used to control foam density may be an integral part of the digital controller or minicomputer 55 or may be a separate controller that operates upon the error signal $N_E$. In its simplest form the control outputs from the feedback section 70 can be the result of a simple proportional algorithm, in which case the various output signals that are used to control the foam density-affecting operating characteristics of the extruder are the error signal $N_E$ multiplied by a constant. Other algorithms may take into account the rate of change of density by use of a differential term or long term error or droop by use of an integral term. These and other control algorithms are well documented in the literature, both in regard to extruder control and in regard to process controls more generally.

In the FIG. 1 example, the feedback correction signals from the feedback portion of the control circuitry operate on one or both of the plastic and foaming agent feed control means 14 and 15 to modify the ratio of foaming agent to raw plastic introduced via the feeder 13. Likewise, the temperature of the plastic may be modified to increase or decrease the viscosity of melt at the die, permitting lesser or greater expansion during foaming, respectively. In the case of an independent controller 27 operating to control the heat exchangers 21-24 as in FIG. 1, one manner of varying the melt temperature is to modify one or more of the setpoints of the temperature controller applicable to one or more of the heat exchangers, those setpoints being the desired temperatures to which heat exchangers attempt to bring the heat sensors 29-32. Furthermore, it may be desirable, as indicated by the broken line output from the block 71 of FIG. 1 to the motor speed control 50, to modify the pull roll speeds slightly as a function of density, bearing in mind that if the dimensions of the foam extrudate are maintained, changes in density will mean changes in volume per unit time extruded and likewise changes in sheet speed. It should further be added that the separate temperature controller 27 may too be an integral part of a single digital controller 55 with setpoints stored in memory and temperature control outputs derived using the microprocessor-based circuitry of the controller, just as this done in currently available digital extruder controllers.

Figure 2:
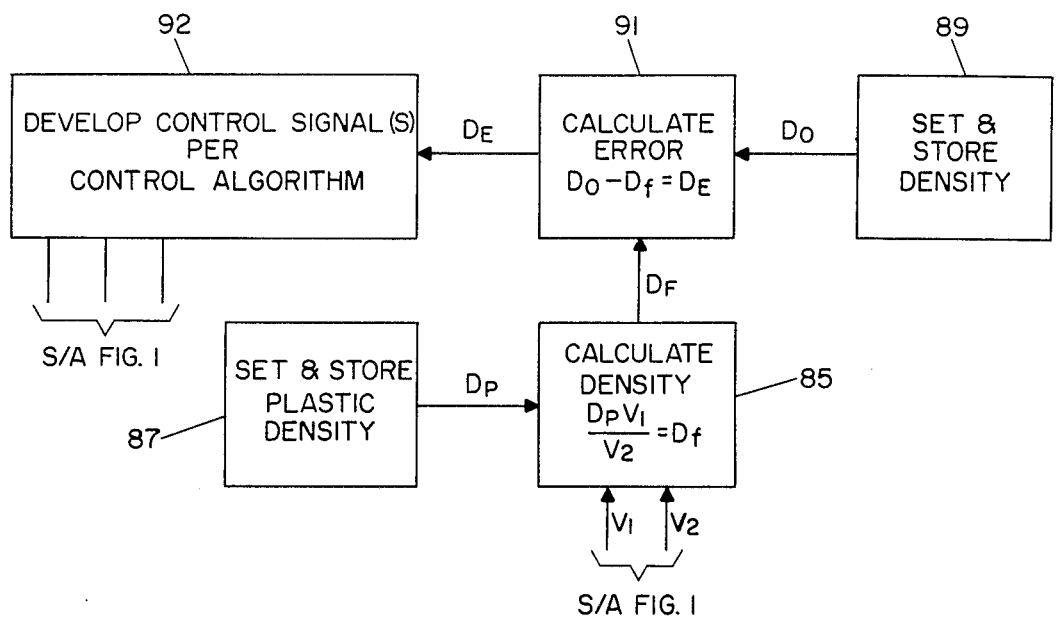
FIG. 2 is a schematic illustration of a modification of the control system of FIG. 1 for control of an extruder based upon the actual density of the foamed plastic extrudate.

In FIG. 2, density-affecting extruder operating characteristics are controlled on the basis of actual foam density. FIG. 2 illustrates changes in the control system and method of FIG. 1 only, the remainder of the system and method being as illustrated in FIG. 1. The volumes $V_1$ and $V_2$ of the unfoamed plastic and foamed extrudate, respectively are calculated as indicated at blocks 52 and 57 of FIG. 1 and are provided for the calculation of actual foam density as indicated at 85 in FIG. 2. Here, the known value of unfoamed plastic density is set and stored, in memory for example, as indicated at 87. This value is made available for the calculation of actual foam density $D_f$ equal to $D_pV_1/V_2$. The foam density, then, is compared with the desired density $D_0$, set and stored at 89 for use in calculating density error $D_E$ at 91 by subtraction of the actual foam density figure from the desired foam density figure. The density error $D_E$ is then employed, at 92 to develop the control signal used thereafter as illustrated in FIG. 1 to modify one or more of the density-affecting extruder operation characheristics and the pull roll speed.

Figure 3:
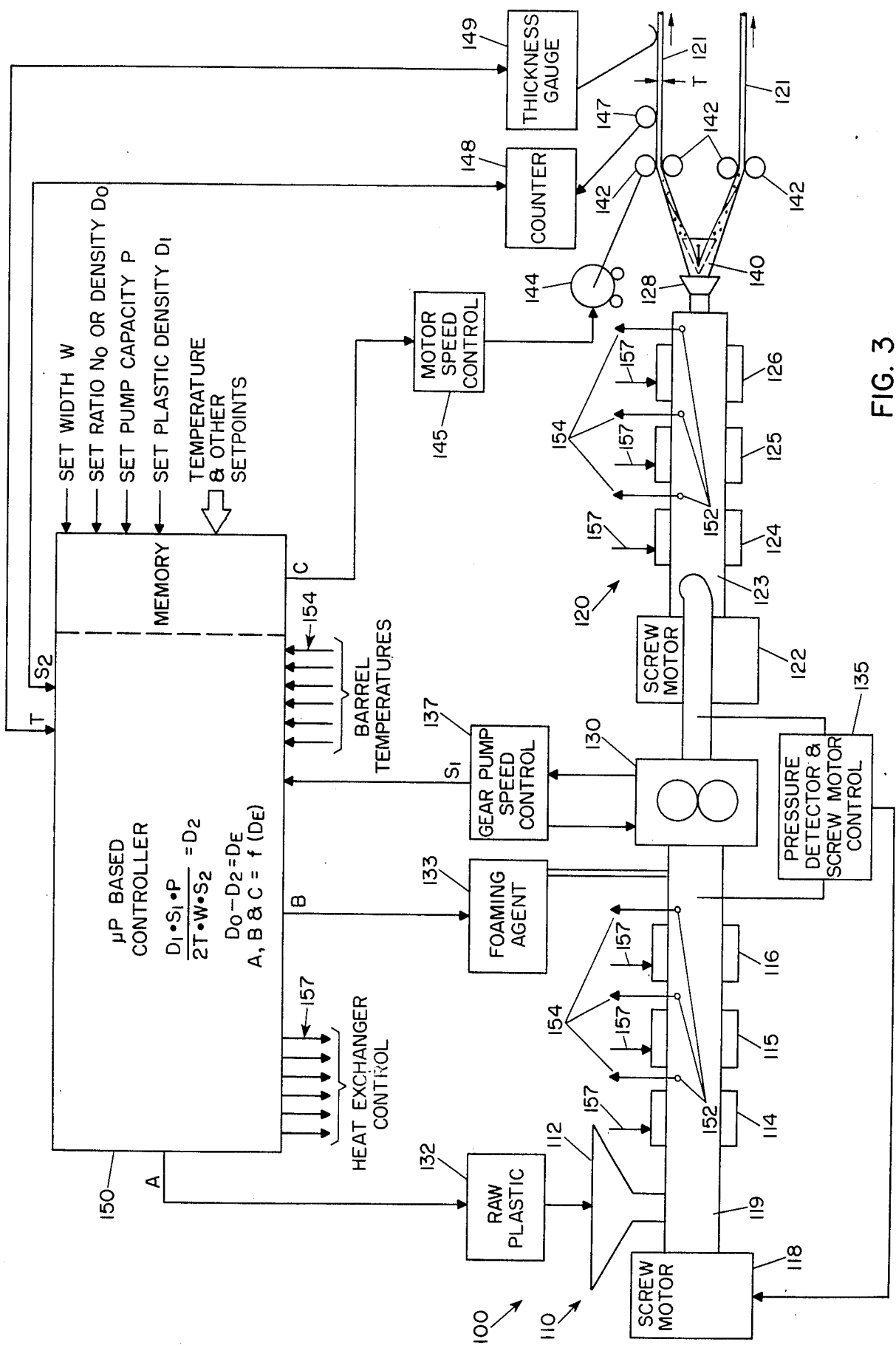
FIG. 3 is a schematic illustration of a foam extruder and a single digital extruder controller controlling several density-affecting extruder operating characteristics as well as pull roll speed.

In FIG. 3 an extrusion line 100 employs tandem extruders 110 and 120 to produce plastic foam film sheets 21. The extruder 110 includes a feeder 112, heat exchangers 114-116 and a screw motor 118 to drive the extruder screw in a barrel 119, and deliver unfoamed plastic melt to a gear pump 130. A variable feed raw plastic source 132 introduces the raw plastic into the feeder 112. Downstream, a variable source 133 of liquid gas foaming agent introduces foaming agent such as Freon just before the gear pump 130. Again, a pressure detector and screw motor control 135, as described in the prior art, senses the pressure differential across the pump 130 to control the screw motor speed 118. The pump 130 is driven at a speed $S_1$ by a gear pump speed control 137 that provides a speed indication, similarly designated $S_1$, to a microprocessor based controller 150. The second extruder 120 is a cooling extruder, extracting heat from the melt prior to extrusion. Its screw motor 122 drives a screw in the barrel 123 to deliver the melt downstream past heat exchangers 124–126 for the purpose of cooling. The melt is moved to a die 128. The plastic is extruded in conventional fashion to a tube 140 of a fixed diameter that is determined by the torpedo 129. Knives 131 slit the tube 140 into two continuous thin sheets 121 of foamed plastic film. Foaming of the plastic sheet occurs as the plastic exits the die 128.

Pull rolls 142 draw the extrudate from the die under control of a driving motor 144 and its motor speed control 145. An idler 147 rides on the upper sheet as it moves towards storage on a wound roll (not shown). A counter 148 associated with the idler 147 measures the speed $S_2$ of the extrudate to provide an output, of like designation, to the controller 150. Finally, a thickness gauge 149 measures the thickness T of the two-ply extrudate to provide to the controller 150 a thickness output also designated T.

The controller 150 can be one of a number of commercially available microprocessor based controllers suitable for controlling one or more extrusion lines, for example the aforementioned CP-660 or CP-671 of Harrel, Inc. The computations particular to this embodiment of the current invention are shown in the block representing the controller 150 in FIG. 3. These computations are easily accomplished by such a controller, or for that matter by a minicomputer used for this purpose. The necessary measured data is introduced to the controller 150 by the gear pump speed control 137, the counter 148, and the thickness gauge 149. The known values, including the width W and the pump capacity P, are manually introduced into memory for purposes of the controller's calculations. In the case of the actual foam density calculation, the known density $D_1$ of the unfoamed plastic also is provided to the controller's memory, as is the desired density $D_0$ of the foam extrudate. Where, density ratio, as described above, is employed to derive the control value, the desired ratio $N_0$ is introduced to memory rather than the density $D_0$ and the unfoamed plastic density $D_1$ is omitted. In the ordinary fashion for such controllers, for the purpose of temperature control, temperature and other setpoints are introduced to memory for comparison with barrel temperature data provided by temperature sensors 152. As indicated at 154, the controller calculates the foam density $D_2 = D_1 S_1 P / 2TWS_2$. The departure of measured density $D_2$ from desired density $D_0$ is calculated, $D_0 - D_2 = D_E$. One or more control signals A, B, C, ... are derived as a function of the density error to control one or more of the rate of introduction of foaming agent, temperature, the rate of introduction of raw plastic, and nip roll running speed. The control values are derived on the basis of control algorithms as discussed above. Outputs of the controller 150 control the temperature along the barrel as indicated at 157. As in FIGS. 1 and 2, these controller outputs although shown going directly to the exchangers, are supplied to the heat exchanger controls, typically a contactor that alters the duty cycle of the electrical heating elements of the exchangers and a cooling fluid valve that controls the passage of cooling fluid through the exchangers. This manner of heat exchange operation is well known and in widespread use. The relationship between the barrel temperature data supplied at 154 from the temperature sensors 152, the temperature setpoints introduced to memory, and the outputs at 157 may be conventional and are not shown. Alternatively, the density $D_E$ may be used to alter slightly the temperature of the extruded foam as a further density control, as described above.

Figure 4:
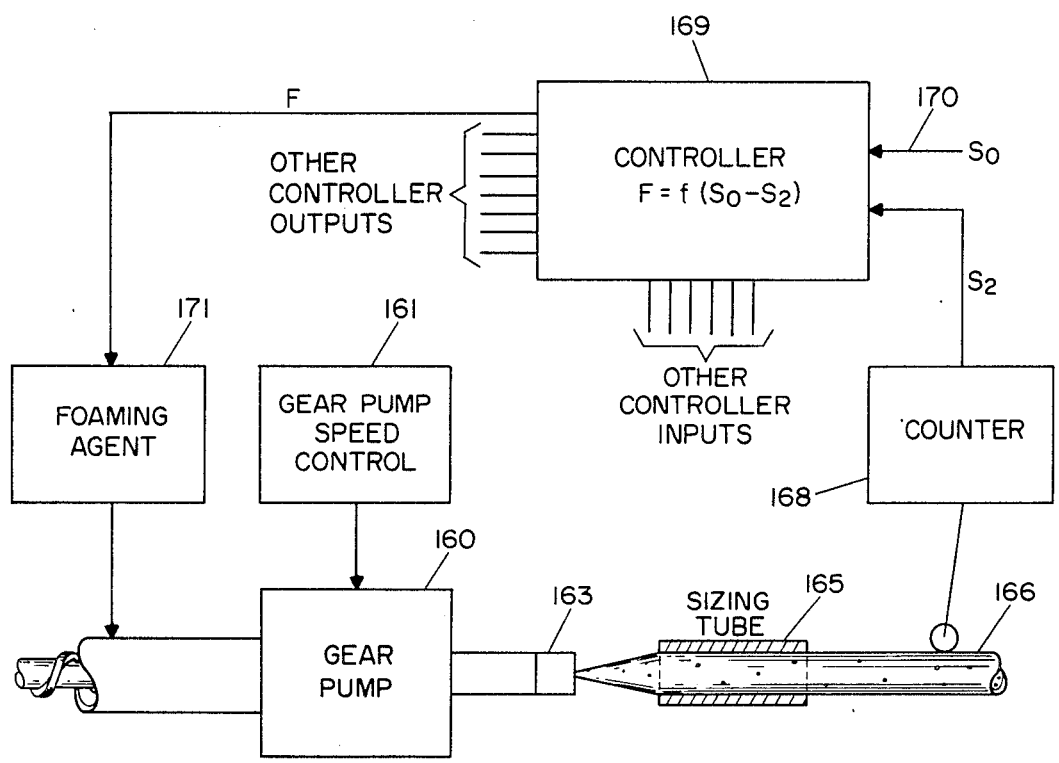
FIG. 4 is a partial schematic illustration of another embodiment of density control for an extruder based on measurement of the speed of the extrudate.

FIG. 4 illustrates a system and method of using just a measurement indicative of extrudate volume per unit time to control extrudate density. Here, a gear pump 160 runs at constant speed under control of the speed control 61. Thus a constant volumetric rate of the melt is delivered to a die 163. If the density of the raw plastic or other unfoamed material is known and the rate of delivery by the pump 160 is known and the extrudate volume per unit time is measured, then, of course, the density of the extrudate can be calculated using the calculations described above. FIG. 4, however, represents an embodiment in which, previously, product of good density has been used to record empirically determined measurements relating to volume per unit time. In FIG. 4, a sizing tube 165 constrains the cross section of the extruded foam rod 166 against variation. Density changes resulting in changes in volume per unit time of extruded rod, then, can only effect length, which is to say speed of the extrudate. A counter 168 measures speed $S_2$. Memory in a controller 169 stores a predetermined desired speed $S_0$ set in at 170. $S_0$ is the speed previously recorded in a successful run of the same product, under the same conditions. The controller compares the measured speed $S_2$ with the desired speed $S_0$. The controller, using an appropriate, known algorithm, develops a control signal F as a function of the comparison of $S_2$ and $S_0$. The control signal F is input to the controllable foaming agent introducing means 171 to correct, or maintain, the density of the extrudate as reflected in its volume per unit time and its monitored speed $S_2$.

Of course if foamed sheet or more complex cross-sectional shapes are extruded in the FIG. 4 embodiment and cross-sectional constraint is no longer possible more dimensional measurements and calculation will be needed to determine volume per unit time, but if the rate of delivery of melt to the die is held constant then measurements are needed only at the extrudate to calculate density or to keep the extrudate close to a previously proven volume per unit time.

Figure 5:
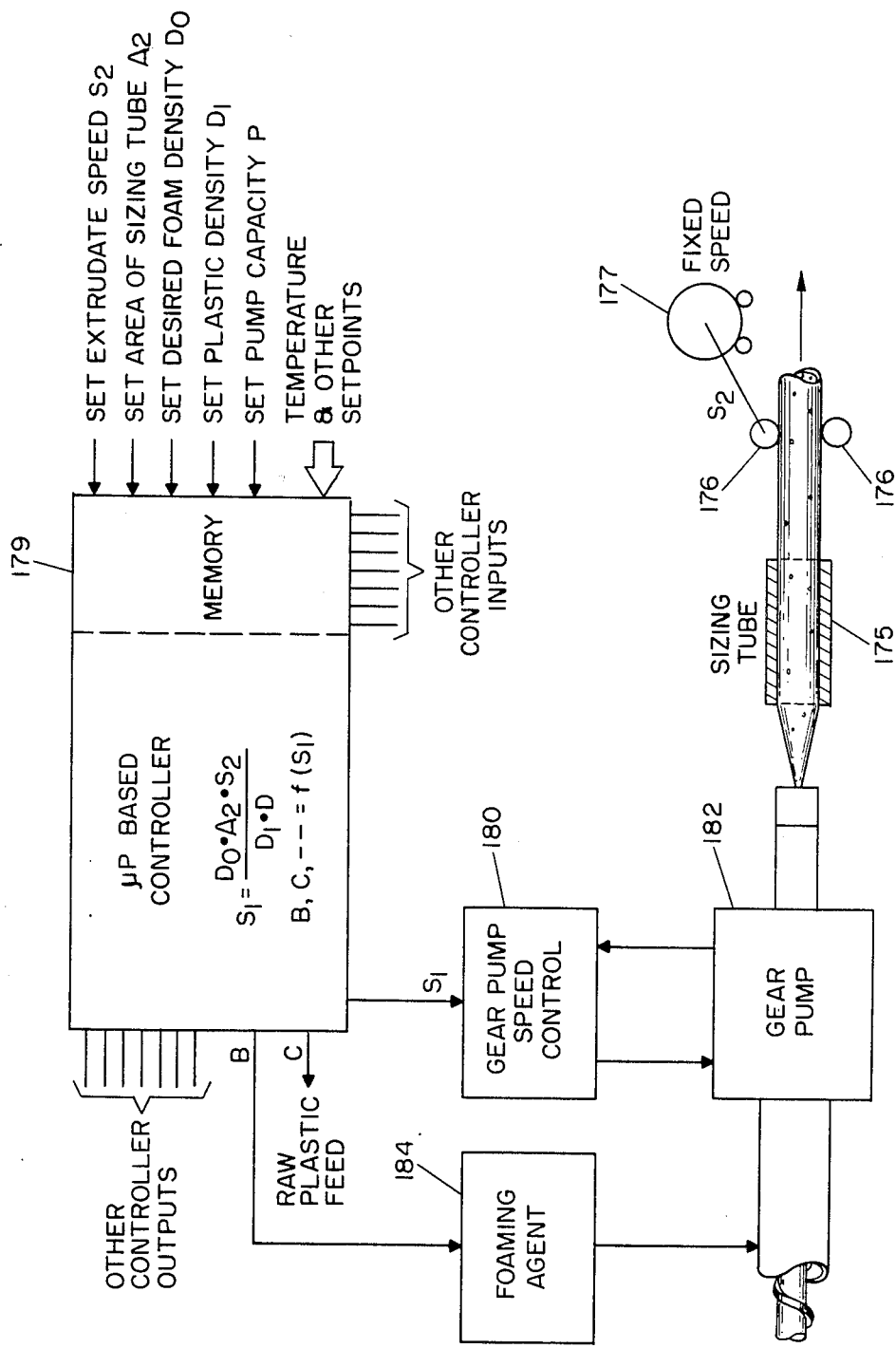
FIG. 5 is a partial schematic illustration of an alternative embodiment in which the volume per unit time of extrudate is fixed and the volume per unit time of unfoamed plastic being delivered to the die is controlled to control extrudate density.

FIG. 5 illustrates the use of a microprocessor based controller in the alternative arrangement wherein the volume per unit time of the extrudate being produced is held constant, and the volume per unit time of unfoamed plastic being delivered to the die is controlled for density control. Here, a sizing tube 175 and pull roll 176 driven at constant speed by a motor 177 provide a fixed volume per unit time of foamed rod extrudate. Because the volume times the density of the extrudate equals the volume times the density of the unfoamed plastic being delivered to the die by the gear pump, the correct gear pump speed can be determined by a microprocessor based controller 179 to deliver the desired foamed density $D_0$. The volume per unit time of extrudate is the area $A_2$ of the sizing tube multiplied by the speed $S_2$ of the extrudate. A known density $D_1$ of the unfoamed plastic and the pump capacity P are set in the controller's memory along with the extrudate speed $S_2$, sizing tube area $A_2$, and the desired foam at density $D_0$. Gear pumps speed $S_1$ is calculated, as shown, and the controller output $S_1$ provides that speed via a gear pump speed control 180 and gear pump 182. Other outputs such as C, controlling the amount of raw plastic fed to the extruder, and B, controlling the amount of foaming agent introduced by the foaming agent introduction means 184, and the like, can be made dependent upon the speed $S_1$ of the gear pump. In conventional fashion temperature and other setpoints are set in memory, other controller inputs, for example temperatures from temperature sensors, are delivered to the controller and compared with setpoints to develop other controller outputs to other extruder controls such as those for the heat exchangers. This same arrangement may be employed based upon previously gathered empirical data, in which case an appropriate speed $S_1$ is set for product previously determined to be suitable in density.

While specific preferred embodiments of the invention have been described, it will be recognized by those skilled in the art that variations of these may be made without departure from the invention, as described in the appended claims.

I claim:

1. A method of controlling the extrusion of foamed extrudate in an extrusion line having an extruder including the steps of:

measuring at least one characteristic of the foamed extrudate that is dependent on the density thereof, controlling the flow of the unfoamed melt in the extruder to provide a known volume per unit time of the unfoamed melt being delivered to the extrusion end of the extruder, developing from the measured characteristic of the foamed extrudate and the known volume being delivered to the extrusion end a control value dependent on the density of the foamed extrudate, and controlling at least one operating characteristic of the extrusion line affecting density of the foamed extrudate based upon the control value.

2. The method according to claim 1 wherein the step of measuring at least one foamed extrudate characteristic comprises measuring at least one cross-sectional dimension of the foamed extrudate, the method including the further step of providing a representation of the speed of the foamed extrudate whereby a measure of the volume per unit time of foamed extrudate is available from the at least one cross-sectional dimension and the speed.

3. The method according to claim 2 wherein the step of developing a control value includes dividing one into the other of the volume per unit time of the unfoamed melt being delivered to the extrusion end of the extruder and the volume per unit time of foamed extrudate being extruded and producing a control electrical signal dependent at least in part upon the step of dividing.

4. The method according to claim 3, wherein step of dividing the volumes comprises developing a ratio of the foamed extrudate volume per unit time to the unfoamed melt volume per unit time, the method further comprises setting and storing a preselected value of that ratio, comparing the developed ratio with the stored ratio value and developing the control value on the basis of the comparison, the step of controlling at least one operating characteristic comprising altering the at least one operating characteristic to maintain the developed ratio at least closely proximate the stored ratio in value.

5. The method according to claim 3 wherein the step of developing a control value includes multiplying the divided volumes per unit time by the density of unfoamed melt to arrive at the density of the foamed extrudate as the control value, the method further comprises setting and storing a preselected value of the foamed extrudate density, comparing the arrived at density of the foamed extrudate with the stored density and developing the control value on the basis of the comparison, the step of controlling at least one operating characteristic of the extrusion line comprising altering the at least one operating characteristic to maintain the foamed extrudate density at least closely proximate the stored density.

6. The method according to claim 1 wherein the step of controlling at least one operating characteristic of the extruder includes controlling the amount of foaming agent per unit volume of unfoamed material introduced into the extruder.

7. The method according to claim 1 wherein the step of controlling at least one operating characteristic of the extruder includes controlling the temperature of the unfoamed melt in the extruder.

8. The method according to claim 1 further comprising the step providing pull off means for the foamed extrudate and controlling the speed of the pull off means as a function of the density of the foamed extrudate.

9. The method according to claim 1 wherein the step of controlling the flow of the unfoamed melt comprises providing a gear pump in the flow of unfoamed melt to the extrusion end of the extruder and controlling the gear pump speed to determine the volume per unit time of flow of the unfoamed melt.

10. A method of controlling the extrusion of foamed extrudate in an extrusion line having an extruder including the steps of:

delivering unfoamed melt to an extruder die at a fixed volume per unit time, measuring at least one dimensional characteristic of the extrudate sufficient to determine volume per unit time thereof, and controlling the amount of foaming as a function of the dimensional measurements to the exclusion of any further measurements of the extrudate.

11. The method according to claim 10, further including the steps of electrically representing a volume per unit time dependent figure based on the at least one measured dimensional characteristic of the extrudate, storing a predetermined, desired volume per unit time indicative figure, comparing the measured and stored figures, developing a control signal as a function of the comparison of measured and stored figures, and controlling at least one density affecting extruder operating characteristic with the control signal.

12. The method according to claim 11, further comprising the steps of constraining the cross-sectional dimensions of the extrudate against variation, the step of measuring at least one dimensional characteristic comprising measuring the extrudate speed, the step of storing comprising storing a desired speed, and the step of comparing comparing the stored and measured speed.

13. A method of controlling the extrusion of foamed extrudate in an extrusion line having an extruder including the steps of:

determining the volume per unit time of the foamed extrudate, and controlling a density determinative characteristic of the extrusion line based upon the volume per unit time of foamed extrudate.

14. The method according to claim 13, wherein the step of determining the volume comprises constraining the extrudate against cross sectional variation and withdrawing the extrudate from the extruder at a fixed speed, the step of controlling a density controlling characteristic comprising controlling the rate of delivery of raw material to an extrusion die.

15. The method according to claim 13, wherein the step of determining the volume per unit time comprise measuring the extrudate, and the step of controlling a density determinative characteristic comprises developing an electrical representation dependent upon said measurement, and developing a corrective feedback signal effective to control said characteristic based upon the electrical representation.

16. An electrical control system for control of density in foam extrusion in an extrusion line including an extruder that has means for the introduction of material into the extruder to form melt therein, means for introduction of a foaming agent into the melt, a die, a barrel, means for moving the melt in the barrel towards the die, heat exchange means in association with the barrel, metering means for controlling the amount of unfoamed melt delivered to the die, and means for measuring, downstream of the die, at least one dimensional characteristic of the extruded foam, the electrical control system including means responsive to the means for measuring at least one dimensional characteristic and exclusive of any nondimensional measured variable of the extrudate, to produce a first electrical indication that is dependent, at least in part, on the density of the extruded foam, means for providing a second electrical indication of the amount of the unfoamed melt being supplied to the die by the metering means, means for deriving, from the first electrical indication dependent on foam density as derived exclusively from dimensional measurement, and the second electrical indication of the amount of unfoamed melt delivered to the die as controlled by the metering means, a signal indicative of the density of the foam, and feedback means to produce a density control signal as a function of the density indicative signal and suitable for controlling at least one density determinative operating parameter of the extrusion line to maintain the density of extruded foam within predetermined limits; whereby extruder density control is based upon dimensional measurement as the only variable measured downstream of the die.

17. The control system according to claim 16, wherein the at least one dimensional characteristic is indicative of the volume per unit time of the foamed extrudate being extruded, the means responsive to the means for measuring the dimensional characteristic produces a first electrical signal indicative of volume per unit time of extruded foam, the means for providing a second electrical indication comprises means for supplying to the deriving means a second signal representative of volume per unit time of unfoamed melt being supplied to the die, the means for deriving comprising means responsive to the unfoamed melt and foam volume per unit time information supplied thereto to develop in said feedback means a feedback signal that varies with departure of foamed extrudate density from a preselected density.

18. The control system according to claim 17 wherein the means for deriving comprises:
(a) means for developing from the first and second electrical signals indicative of volume per unit time an electrical representation of the ratio of the densities of the foamed extrudate and unfoamed melt,
(b) means for retaining a preselected value of density ratio, and
(c) means for comparing the preselected value and the developed electrical ratio representation to produce an electrical error indication supplied to the feedback means.

19. The control system according to claim 17 further comprising means for receiving and retaining a value of the density of the unfoamed melt, and the means for deriving comprises means for calculating the value of the density of the foamed extrudate based upon the retained value of unfoamed melt density and the first and second electrical signals indicative of volume per unit time.

20. An electrical control system for control of density in foam extrusion in an extrusion line including an extruder that has means for the introduction of material into the extruder to form melt therein, means for introduction of a foaming agent into the melt, a die, a barrel, means for moving the melt in the barrel towards the die, heat exchange means in association with the barrel, and metering means for controlling the amount of unfoamed melt delivered to the die, means for determining the volume per unit time of the foamed extrudate, and means for controlling a density determinative extruder operating characteristic based upon the volume per unit time of foamed extrudate.

21. The control system according to claim 20 wherein the means for determining the volume per unit time comprises means for constraining the cross sectional dimensions of the extrudate and means for controlling the speed at which extrudate is moved from the die, and said means for controlling a density determinative extruder operating characteristic comprises means for controlling rate of delivery of unfoamed melt to the die by said metering means.

22. The control system according to claim 21, wherein the means for controlling the rate of delivery comprises means for providing an electrical speed controlling signal to a gear pump that is the metering means of the extruder.

23. The control system according to claim 20, wherein the means for determining the volume per unit time of the foamed extrudate comprises means for developing an electrical signal dependent upon volume per unit time of extrudate from a measure of at least one dimensional characteristic of the extrudate and the means for controlling a density determinative characteristic comprises means for deriving a feedback extruder operation control signal from the signal dependent upon volume per unit time.

24. The control system according to claim 23, wherein the means for controlling a density determinative characteristic comprises means for modifying the ratio of foaming agent to raw material introduced into the extruder.

25. An electrical control system for control of density in foam extrusion in an extrusion line including an extruder that has means for the introduction of material into the extruder to form melt therein, means for introduction of a foaming agent into the melt, a die, a barrel, means for moving the melt in the barrel towards the die, heat exchange means in association with the barrel, metering means for controlling the amount of unfoamed melt delivered to the die, and means for altering at least one characteristic of the extrusion line, the electrical control system including means for developing an electrical signal variable with volume per unit time of the extruded foam, means for developing a feedback signal from the signal variable with volume per unit time, and means for applying the feedback signal to the means for altering at least one foam density affecting characteristic of the extrusion line to control the density of the foamed extrudate.

26. The control system according to claim 25 for use with an extrusion line wherein the metering means delivers melt at a fixed rate to the die and the extrudate is constrained against changes in cross-sectional dimension, the means for developing an electrical signal variable with the volume per unit time comprises means for electrically representing the speed of the extrudate, and the means for developing a feedback signal comprises means for storing a value of the speed of the extrudate at a desired density and means for comparing the stored value and the measured value of speed to develop a control signal that is a function of said comparison.

27. An electrical control system for control of density in foam extrusion by an extrusion line having an extruder that includes means for the introduction of material into the extruder to foam melt therein, means for the introduction of a foaming agent into the melt, a die, a barrel, means for moving melt in the barrel towards the die, heat exchange means in association with the barrel, and means for delivering a metered amount of unfoamed melt to the die, the system including:

means for measuring from the foam being extruded at least one characteristic determinative of volume per unit time of the extruded foam, computation means having an input from the means for measuring from the foam, the computation means comprising means for developing, based only on measurements determinative of volume per unit time, including said input, an electrically represented value dependent upon the density of the foam, and control means responsive to the electrically represented value dependent upon the density of the foam to provide a control signal operative to alter at least one operating characteristic of the extrusion line effective to vary the foam density.

28. The control system according to claim 27, further comprising means for providing electrical representations of the delivery of melt to the die determinative of volume per unit time of unfoamed melt delivered by the delivery means, and said computation means further comprising an input from the means for providing electrical representations determinative of the volume of unfoamed melt per unit time, the computation means comprising means for developing the electrically represented value dependent upon the density of the foam from both of said inputs determinative of volume per unit time of the extruded foam and volume per unit time of the unfoamed melt.

29. The system according to claim 27 for use with an extrusion line in which the means for delivering a metered amount of unfoamed melt to the die delivers a fixed volume per unit time of the unfoamed melt, whereby variations in volume per unit time of the extrudate are indicative substantially only of density variations therein.

30. The system according to claim 29 for use in an extrusion line including means constraining the cross-sectional dimensions of the extrudate against variation, the means for measuring from the foam being extruded at least one characteristic determinative of volume per unit time of the extrudate foam comprising means for measuring the speed of the foam and the means for developing the electrically represented value dependent upon the density of the foam developing said value based on the speed of the foam.

31. The system according to claim 28 wherein the means for delivering a metered amount of unfoamed melt to the die is a gear pump in the path of the flow of unfoamed melt upstream of the die, the means for providing electrical representations of the delivery of melt to the die comprises means for providing an electrical indication of the speed of the gear pump, the speed thereof being determinative of the volume of the unfoamed melt flowing to the die.

32. The system according to claim 27 wherein the means for measuring from the foam includes means for electrically representing the speed of movement of the foam and means for measuring at least one cross-sectional dimension of the foam.

33. The system according to claim 32, wherein the computation means comprises means for calculating a value of a ratio of volume of unfoamed melt per unit time being delivered to the die and a volume of foamed extrudate per unit time being extruded, said ratio being a function of the density of the foamed extrudate.

34. The system according to claim 33, wherein the computation means includes means for setting and storing a predetermined, desired value of the ratio of unfoamed melt and foamed extrudate volumes per unit time and means for comparing the stored and the calculated ratios to develop said electrically represented value dependent upon the density of the foam.

35. The system according to claim 32 wherein the computation means comprises means for calculating a value for the density of the foamed extrudate being extruded, means for setting and storing a predetermined, desired value of the foam density, and means for comparing the stored and the calculated foamed extrudate densities to develop said electrically represented value dependent on the density of the foam.

36. The system according to claim 35 further comprising means for providing electrical representation of the delivery of melt to the die determinative of volume per unit time of the unfoamed melt delivered by the delivery means, means for providing to said comoutation means a value of density of the unfoamed melt, said computation means determining the density of the foamed extrudate being extruded from values determinative of the density and volume per unit time of the unfoamed melt being delivered to the die and volume per unit time of the foamed extrudate being extruded.

37. The system according to claim 27 further comprising means for varying the amount of the foaming agent per unit volume of the material introduced into the extruder, said control means operative to alter at least one operating characteristic being connected in controlling relation to said means for varying the amount of the foaming agent.

38. The system according to claim 27, said control means operative to alter at least one operating characteristic being connected into a control for the heat exchange means, whereby variations in the density of extruded foam result in alteration of the exchange of heat between the barrel of the extruder and the heat exchange means.

39. The system according to claim 27 further comprising at least one pair of pull rolls for the foamed exturdate, a pull roll motor in driving relation to the pull rolls, a speed control for the pull roll motor and means interconnecting the control means operative to alter at least one characteristic and the pull roll motor control to vary pull roll speed as the density of foamed extrudate changes.

40. A foam extrusion line having an extruder including means for the introduction of material into the extruder to form melt therein, means for the introduction of a foaming agent into the melt, a die, a barrel, means for moving the melt in the barrel towards the die, heat exchange means in association with the barrel, metering means for controlling the amount of unfoamed melt delivered to the die, means for measuring downstream of the die at least one characteristic of foamed extrudate being extruded determinative of the volume per unit time of the foamed extrudate, and means in controlling relation to at least one foam density affecting operating variable of the extrusion line to control the density of the foamed extrudate in dependance upon the measurement of the characteristic of the foamed extrudate, measurement downstream of the die relating to volume per unit time being the only downstream measurement used by said means in controlling relation to control density.

41. The extrusion line according to claim 40 further comprising means for electrically representing the amount of unfoamed melt being delivered to the die and said means in controlling relation comprising means for controlling the density of foamed extrudate in dependance upon both the measurement of the characteristic of the foamed extrudate and the electrical representation of the amount of the unfoamed melt being delivered to the die.

42. The extrusion line according to claim 40 wherein the metering means comprises means to deliver the melt to the die at a fixed volume per unit time, whereby the measured characteristic of the extrudate is determinative of extrudate density.

43. The extrusion line according to claim 42, the extrusion line further comprising means for constraining the cross-sectional dimensions of the extrudate against variation, and the means for measuring at least one characteristic of foamed extrudate determinative of volume per unit time comprising means for measuring the speed of the extrudate, the means in controlling relation comprising means to control the density in dependance on the measured speed of the extrudate.

44. The extrusion line according to claim 43 wherein the means in controlling relation comprises means for storing a preselected, desired extrudate speed, means for comparing the desired speed with the measured speed and for developing a control signal as a function of the comparison of stored and measured speeds.

45. The extrusion line according to claim 41 wherein the metering means comprises a gear pump intermediate the barrel and the die, the electrically represented amount is an electrical representation of the volume per unit time of the unfoamed melt being delivered by the gear pump to the die, and the means in controlling relation is responsive to the measured characteristic of the foamed extrudate and the representation of the volume per unit time of unfoamed melt to derive at least one control signal for the extrusion line dependent on the density of the extruded foam.

46. The extrusion line according to claim 41 wherein the metering means comprises a gear pump, the extruder including a second barrel downstream for cooling of the unfused plastic prior to its emission through the die, and said gear pump controlling the volume of the unfoamed melt delivered to the die, the electrically represented amount is an electrical representation of the volume per unit time of the unfoamed melt being delivered by the gear pump to the die, and the means in controlling relation is responsive to the measured characteristic of the foamed extrudate and the representation of the volume per unit time of unfoamed melt to derive at least one control signal for the extrusion line dependent on the density of the extruded foam.

47. The extruder according to claim 46 wherein the gear pump is located upstream of the second barrel, and said gear pump controls the volume per unit time of unfused melt delivered through the second barrel to the die.

48. The extruder according to claim 27 wherein the means to deliver the melt to the die at a fixed rate of speed comprises a gear pump and means to operate the gear pump at a constant speed.

* * * * *